3,210,299
POLYETHYLENE IMINE ANION-EXCHANGE RESINS OF SPONGE-LIKE STRUCTURE
Walter Hagge and Günther Naumann, Leverkusen, and Otto Schneider, Cologne-Flittard, Germany, assignors to Farbenfabriken Bayer Aktiengesellschaft, Leverkusen, Germany, a German corporation
No Drawing. Filed Sept. 11, 1962, Ser. No. 222,957
Claims priority, application Germany, Sept. 22, 1961, F 34,977
6 Claims. (Cl. 260—2.1)

The invention relates to a process for the production of anion-exchange resins by condensation of polyethylene imine and epihalohydrins. More particularly it concerns the preparation of anion-exchange resins by the condensation of polyethylene imine and epihalohydrins in the presence of organic liquids, said anion-exchange resins having a special porous structure and good adsorption properties.

Condensation resins of polyethylene imine and epichlorohydrins have long been known as high capacity anion exchangers having a medium to strong basicity. However, they have only a very slight capacity for general adsorption, i.e., they have practically no porosity.

Recently, however, the interest in ion exchanger synthesis has been directed increasingly towards forming resins with an increased pore volume in their structure.

The first experiments in this direction were decolorising resins based on condensation products which were produced in the form of aqueous jellies and were intended mainly for the sugar industry, as is more fully described by way of example in German patent specification No. 844,663. The large-volume structure is achieved in this case substantially by strong dilution of the aqueous condensation mixture. The synthesis of exchanger resins of this type has hitherto only been possible on the basis of weakly basic or weakly acid components.

In attempting to reduce the cross-linking by decreasing the proportion of epichlorhydrin to the production of analogous polycondensates based on polyimine, and thus to increase the pore volume, very soft resin jellies are obtained. These very soft resin jellies show a slight improvement in the neutral decolorizing power, but this may, however, merely depend on a dilution effect resulting from the increased quantity of water for swelling.

Further efforts in modifying the structure led to the synthesis of polymerization resins, the cross-linking of which and also of the quantity of catalyst employed were modified. A supplement to this has in recent times been cross-linking methods by means of electron radiation.

Quite another method of obtaining of a pore structure consists in the subsequent removal of components of low molecular weight from the resin matrix with the aid of solvents, as well as by carrying out the polymerization with the addition of solvents.

With the last-mentioned processes, products having particularly good adsorption properties can be produced by adding, during the polymerization, monomer solvents in which the polymeric product does not show any swelling. In this process considerable quantities of a solvent with the aforementioned properties, for example, white spirit or cyclohexanone, are added polymerization to, for example, a monomer mixture of styrene and divinyl benzene with benzoyl peroxide as catalyst.

It was not readily possible to apply this method to the production of condensation resins, especially those of polyethylene imine and an epihalohydrin, since the condensation mixtures are present in aqueous solution and are prepared by the usual methods. However, the prepared condensation resins swell in such liquids which are homogeneously miscible with the condensation mixture, such as particularly water itself, as well as waterlike solvents, including higher alcohols. Accordingly, experiments with primary, secondary or tertiary alcohols up to the hexyl alcohols also produced no improvement in the decolorizing properties of the exchanger under the otherwise usual conditions for the production of the condensation.

It has been found that anion-exchange resins with sponge-like structure can be obtained by condensation of polyethylene imine with epihalohydrin in an aqueous medium if the condensation is effected in the presence of, and in intimate admixture with, solvents which are immiscible with water and in which the condensation products are neither soluble nor swellable. Suitable solvents are, for example aliphatic hydrocarbons, such as heptane, iso-octane and white spirit, cyclic alcohols such as cyclohexanol and cyclic ketones such as cyclohexanone.

In order to carry out the condensation, the said solvents are introduced, advantageously in amounts from 5 to 100 percent, preferably from 10 to 60 percent of weight, calculated on the aqueous condensation mixture, and are finely dispersed in the condensation mixture.

In order to produce dispersions which are of particularly finely divided form, it is advisable to effect the dispersion of the solvents by adding emulsifiers such as oleic acid, linolenic acid, linoleic acid and olein-medialanic acid. The condensation reaction is carried out at a temperature in the range between 0° and 100° C. If necessary, the required temperature is maintained by cooling, for the condensation reaction runs exothermic. The ratio of weight of polyethyleneimine per weight epihalohydrin may be from 1:05 to 1:1, said polyethyleneimine having a viscosity in the range from 10,000 to 100,000.

The term "spongy-like" structure as used herein the specification and in the claims refers to a unique porous structure. The spongy structure depends on the small veins which permeate the resin such that the resin is capable of taking up a liquid which exerts no swelling action thereon. The spongy-like structure is responsible for the numeral and unexpected properties of the resin obtained according to the process of the invention. The resultant anion-exchange-resins having the properties as set-out in the following table are obtained by the process described, by varying the nature and quantity of the solvent added and also by various types of after-treatments of the condensation product:

TABLE.—POLYIMINE RESINS WITH POROUS STRUCTURE

| No. | Production | | | Decolorizing properties (Cl-form) | | Total wt. cap. in mval./g. | Useful vol. cap. in g. CaO/l. |
|---|---|---|---|---|---|---|---|
| | Added solvent | | After-treatment | Standing test (stat. equilibrium) in percent decolorization | Filter experiments (dynam. equilibrium) in liter liquid with 1 liter resin >50% decolorization | | |
| | Type | Amount in percent by weight of the polyimine | | | | | |
| 1 | | | Drying (110° C.) | 58 | <10 | 6.2 | 29 |
| 2 | Cyclohexanone | 53 | do | 67 | | | |
| 3 | do | 53 | Steaming (100° C.) | 86 | | | |
| 4 | Cyclohexanol | 157 | do | 92 | 48 | 7.4 | 36 |
| 5 | do | 157 | Plus quarternization | 85 | 78 | 2.4 | 14 |

FOR COMPARISON NORMAL COMMERCIAL DECOLORIZING RESINS

| | | | | | | | |
|---|---|---|---|---|---|---|---|
| m-Phenylenediamine-resin | | | | 89 | 85 | | |
| Quat. ammonium resin (styrene) porous | | | | 89 | 93 | 3.5 | 10 |

The test for the decolorizing power of the resin is preferably carried out in one case in a standing test with dilute molasses, which have been clarified beforehand with kieselguhr, stabilized by adding formalin and adjusted to a certain degree of color. The test is carried out by shaking 50 ml. of resin (Cl-form) by hand in a 250 ml. mixing cylinder with 100 ml. of the described molasses solution for 1 minute. After leaving to stand for 24 hours, the supernatant solution is decanted or filtered off. The percentage decoloration is established by colorimetric determination of the degree of color in the original as well as in the treated molasses solutions.

Resins which have shown favourable results in the standing test are also checked in continuous flow (specific loading 5) for neutral adsorption in a laboratory filter (100 ml.), also in the Cl-form and with the same solution of molasses. In this case, with the individual resins, there are established for comparison purposes the volumes of liquid which still show a predetermined minimum value as regards decolorization (for example, 50 percent) after the treatment.

The test data of the separate resins, as regards decolorization and capacity, can be seen from the table. This table also contains, where available, the corresponding values of normal commercial decolorizing resins.

In the standing test, a distinct increase in the decolorizing values is found when a solvent is added to the condensation mixture (No. 2 as compared with No. 1).

The values were further improved by steaming the material (No. 3). However, there are now no longer any substantial differences by comparison with normal commercial anion exchangers with high general adsorption.

The comparative testing of the products of experiments 4 and 5 in the filter test showed, with quaternized resins, a preferred permanent decolorizing power which is in the order of magnitude of normal commercial decolorizing resins. The products produced according to the invention constitute yellow to yellowish-brown resins in broken grain form or in bead form. They are also suitable, inter alia, for the adsorption of detergents from waters.

The regeneration of the porous polyimine resins is preferably effected with alkaline common salt solution.

The examples which are hereinafter described will serve more fully for characterizing the method of production, the parts indicated in said examples being parts by weight.

*Example 1*

108 parts of polyethylene imine (water content about 50 percent and viscosity 25,000 cp.) are dissolved in 144 parts of water and 16.8 g. of concentrated hydrochloric acid (d.=1.19). After adding 28 parts of cyclohexanone and 1 part of oleic acid, the mixture is shaken for 2 hours in a shaking machine. The emulsion thus formed is then adjusted to 25° C. and 43.2 parts of epichlorhydrin are added all at once while stirring. The temperature immediately starts to rise spontaneously. After 28 minutes, the mass solidifies at 60° C. into a white opaque jelly. This is roughly comminuted after cooling, treated with a flow of steam for 8 hours in a cylindrical vessel and thereafter dried for 24 hours at 110° C. The resin is finally swelled in water, ground while wet and screened to a grain size of 0.3 to 1.5 mm. The product has the properties described under No. 3 of the above table.

*Example 2*

202 parts of polyethylene imine (water content about 50% and viscosity 25,000 cp.) are dissolved in 269 parts of a 4 percent aqueous hydrochloric acid solution. After adding 159 parts of cyclohexanol and 0.1 g. of oleinmedialanic acid, the mixture is shaken for 2 hours in a shaking machine. The emulsion thus formed is cooled to $\leq 5°$ C. and, while stirring, 87.7 g. of epichlorhydrin are added all at once, the said epichlorhydrin having also been adjusted beforehand to a temperature of $\leq 5°$ C. The cooled reaction mixture is then introduced while stirring vigorously into 2290 parts of o-dichlorobenzene at 60° C., in which it is immediately distributed in the form of small drops. The temperature is thereupon gradually raised within 5 hours to 95° C. After cooling, the bead-like condensation product is filtered off, washed several times with methanol in water, subjected for 8 hours to a treatment with a stream of steam and screened out to a grain size of 0.3 to 1.0 mm. The product has the properties described under No. 4 of the above table.

*Example 3*

The product prepared according to Example 2 is quaternized in the following manner: 100 parts by volume of resin are stirred with 100 parts of water. While cooling with ice and stirring mechanically, 60 parts of dimethyl sulfate are added thereto over a period of 30 minutes. The internal temperature is not to exceed 3° C. The product is thereafter separated from the reaction liquid and thoroughly washed with water. It has the properties described under No. 5 of the above table.

We claim:

1. In a process for manufacturing anion-exchange resins by condensation of a polyethylene imine with an epihalohydrin in an aqueous medium, the improvement which comprises effecting said condensation in the presence of an organic solvent which is immiscible with water and in which the condensation product is neither soluble nor swellable, said organic solvent being a member selected from the group consisting of aliphatic hydrocarbon, cyclohexanol, and cyclohexanone.

2. The process of claim 1 in which the epihalohydrin is epichlorhydrin.

3. The process of claim 1 in which the organic solvent is cyclohexane.

4. The process of claim 1 in which the organic solvent is cyclohexanol.

5. In a process for manufacturing anion-exchange resins by condensation of a polyethylene imine with an epihalohydrin in an aqueous medium, the improvement which comprises effecting said condensation with a polyethylene imine having a viscosity in a range from 10,000–100,000 cp. and an epihalohydrin at a temperature from about 0–100° C. in the presence of an organic solvent immiscible with water, in which organic solvent the condensation product is neither soluble nor swellable, said organic solvent being a member selected from the group consisting of heptane, iso-octane, white spirit, cyclohexanol and cyclohexanone.

6. An anion-exchange resin obtained by condensation of polyethylene imine having a viscosity of about 10,000–100,000 cp. and epichlorohydrin, admixed in a ratio of about 1:.5–1 at a temperature of about 0°–100° C., said condensation being effected in water and in the presence of 5–100% of an immiscible organic solvent selected from the group consisting of heptane, iso-octane, white spirit, cyclohexane and cyclohexanone, based on the water-condensation mixture, the condensation product being insoluble and non-swellable in the emulsified organic solvent.

References Cited by the Examiner
FOREIGN PATENTS
1,205,505   8/59   Great Britain.
849,122   9/60   France.

OTHER REFERENCES
Shepherd, Chemical Society Journal, 1956, pp. 2448–2452.

Shepherd et al., Chemical Society Journal, 1957, pp. 86–92.

WILLIAM H. SHORT, *Primary Examiner.*